United States Patent
Liu et al.

(10) Patent No.: US 9,521,581 B2
(45) Date of Patent: *Dec. 13, 2016

(54) FRAME PADDING FOR WIRELESS COMMUNICATIONS

(71) Applicant: Marvell World Trade Ltd., St. Michael (BB)

(72) Inventors: Yong Liu, Campbell, CA (US); Harish Ramamurthy, Sunnyvale, CA (US); Ken Kinwah Ho, San Jose, CA (US); Raja Banerjea, Sunnyvale, CA (US); Hongyuan Zhang, Fremont, CA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

This patent is subject to a terminal disclaimer.

(21) Appl. No.: 14/989,754

(22) Filed: Jan. 6, 2016

(65) Prior Publication Data
US 2016/0119815 A1    Apr. 28, 2016

Related U.S. Application Data

(63) Continuation of application No. 13/830,672, filed on Mar. 14, 2013, now Pat. No. 9,237,597, which is a (Continued)

(51) Int. Cl.
*H04W 4/00* (2009.01)
*H04L 12/66* (2006.01)
(Continued)

(52) U.S. Cl.
CPC ............... *H04W 28/06* (2013.01); *H04L 1/06* (2013.01); *H04L 1/1614* (2013.01); (Continued)

(58) Field of Classification Search
CPC ......... H04L 1/06; H04L 1/1614; H04L 5/0064
See application file for complete search history.

(56) References Cited

U.S. PATENT DOCUMENTS 6,671,284 B1    12/2003  Yonge et al.
8,270,909 B2 *   9/2012  Zhang ............... H04B 7/0413
                                                370/334
(Continued)

FOREIGN PATENT DOCUMENTS

EP    2104245    9/2009

OTHER PUBLICATIONS

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band," IEEE Std. 802.11g (2003), 69 pages.

(Continued)

*Primary Examiner* — Melanie Jagannathan

(57) ABSTRACT

Systems and techniques relating to wireless communications are described. A described technique includes generating a physical frame, the physical frame including (i) spatially steered length fields and (ii) spatially steered frames that respectively include aggregated medium access control data units (A-MPDUs) that encapsulate data, the steered length fields respectively indicating lengths of the A-MPDUs in number of four-octet units. Generating the physical frame can include including after an A-MPDU of the A-MPDUs in a steered frame of the steered frames, (i) a medium access control layer pad and (ii) a physical layer pad. A length of the medium access control layer pad and a length of the physical layer pad can be based on the physical frame.

21 Claims, 11 Drawing Sheets

Related U.S. Application Data continuation of application No. 12/964,584, filed on Dec. 9, 2010, now Pat. No. 8,400,968.

(60) Provisional application No. 61/347,144, filed on May 21, 2010, provisional application No. 61/326,499, filed on Apr. 21, 2010, provisional application No. 61/285,112, filed on Dec. 9, 2009.

(51) Int. Cl.
| | | |
|---|---|---|
| *H04J 3/22* | (2006.01) | |
| *H04W 28/06* | (2009.01) | |
| *H04L 1/06* | (2006.01) | |
| *H04L 1/16* | (2006.01) | |
| *H04L 5/00* | (2006.01) | |
| *H04W 84/12* | (2009.01) | |
| *H04L 29/08* | (2006.01) | |
| *H04W 72/04* | (2009.01) | |

(52) U.S. Cl.
CPC ............ *H04L 1/1685* (2013.01); *H04L 5/001* (2013.01); *H04L 5/0032* (2013.01); *H04L 5/0037* (2013.01); *H04L 5/0064* (2013.01); *H04L 5/0094* (2013.01); *H04L 69/324* (2013.01); *H04W 84/12* (2013.01); *H04L 5/0023* (2013.01); *H04W 72/042* (2013.01)

(56) References Cited

U.S. PATENT DOCUMENTS

| | | | |
|---|---|---|---|
| 8,379,757 B1 | 2/2013 | Zhang et al. | |
| 8,773,969 B1 * | 7/2014 | Zhang ................. | H04L 27/2602 370/208 |
| 2005/0114489 A1 | 5/2005 | Yonge et al. | |
| 2006/0056443 A1 | 3/2006 | Tao et al. | |
| 2006/0189352 A1 | 8/2006 | Nagai et al. | |
| 2007/0126612 A1 | 6/2007 | Miller | |
| 2007/0153757 A1 | 7/2007 | Kim et al. | |
| 2007/0263568 A1 | 11/2007 | Kim et al. | |
| 2008/0150675 A1 | 6/2008 | Hirano et al. | |
| 2008/0205648 A1 | 8/2008 | Hanov et al. | |
| 2009/0259913 A1 | 10/2009 | Myung et al. | |
| 2010/0014463 A1 | 1/2010 | Nagai et al. | |
| 2010/0100795 A1 | 4/2010 | Yuan et al. | |
| 2010/0238932 A1 | 9/2010 | Kliger et al. | |
| 2010/0246543 A1 | 9/2010 | Rajkotia et al. | |
| 2010/0260138 A1 | 10/2010 | Liu et al. | |
| 2011/0038332 A1 | 2/2011 | Liu et al. | |
| 2011/0044271 A1 | 2/2011 | Hong et al. | |
| 2011/0134816 A1 | 6/2011 | Liu et al. | |
| 2011/0188518 A1 | 8/2011 | Kenney et al. | |
| 2011/0200130 A1 | 8/2011 | Choi et al. | |
| 2011/0249660 A1 | 10/2011 | Noh et al. | |

OTHER PUBLICATIONS

"Part 11: Wireless LAN Medium Access Control (MAC) and Physical Layer (PHY) specifications: Higher-Speed Physical Layer Extension in the 2.4 GHz Band", IEEE Std 802.11a, 1999, 91 pages.

"Part II: Wireless LAN Medium Access Control (MAC) and Physical Layer (PHY) specifications: Higher-Speed Physical Layer Extension in the 2.4 GHz Band," IEEE Std. 802.11b (1999), 96 pages.

"TGn Sync Proposal Technical Specification", IEEE Std. 802.11n, 2005, 131 pages.

Information technology—Telecommunications and information exchange between systems—Local and metropolitan networks—specific requirements. Part 11: Wireless LAN Medium Access Control (MAC) and Physical Layer (PHY) Specifications, IEEE Std. 802.11n, Oct. 29, 2009, 535 pages.

International Search Report and Written Opinion for App. Ser. No. PCT/US2010/029275, mailed Aug. 12, 2010, 14 pages.

Sun, Jung Eun, Authorized Officer, Korean Intellectual Property Office, PCT International Application No. PCT/US10/059766, in International Search Report mailed Aug. 16, 2011, 8 pages.

Supplement to Carrier Sense Multiple Access with Collision Detection (CSMA/CD) Access Method and Physical Layer Specifications—Frame Extensions for Virtual Bridged Local Area Network (VLAN) Tagging on 802.3 Networks, IEEE Std 802.3ac-1998, 1998, 19 pages.

Zhang et al., "Exploiting Multi-Antennas for Opportunistic Spectrum Sharing in Cognitive Radio Networks," IEEE The 18th Annual IEEE International Symposium on Personal, Indoor and Mobile Radio Communications (PIMRC), 2007, 5 pages.

IEEE Std 802.11a-1999; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications—High-speed Physical Layer in the 5 GHz Band; 1999; pp. 1-83; Institute of Electrical and Electronics Engineers, Inc.

Kiran Gunnam, Gwan Choi, Weihuang Wang, Mark Yeary; Multi-Rate Layered Decoder Architecture for Block LDPC Codes of the IEEE 802.1 in Wireless Standard; 2007; pp. 1645-1648; Institute of Electrical and Electronics Engineers, Inc.

Notice of Reasons for Rejection, JP Application No. 2012-543291, Feb. 18, 2014, 3 pages.

\* cited by examiner

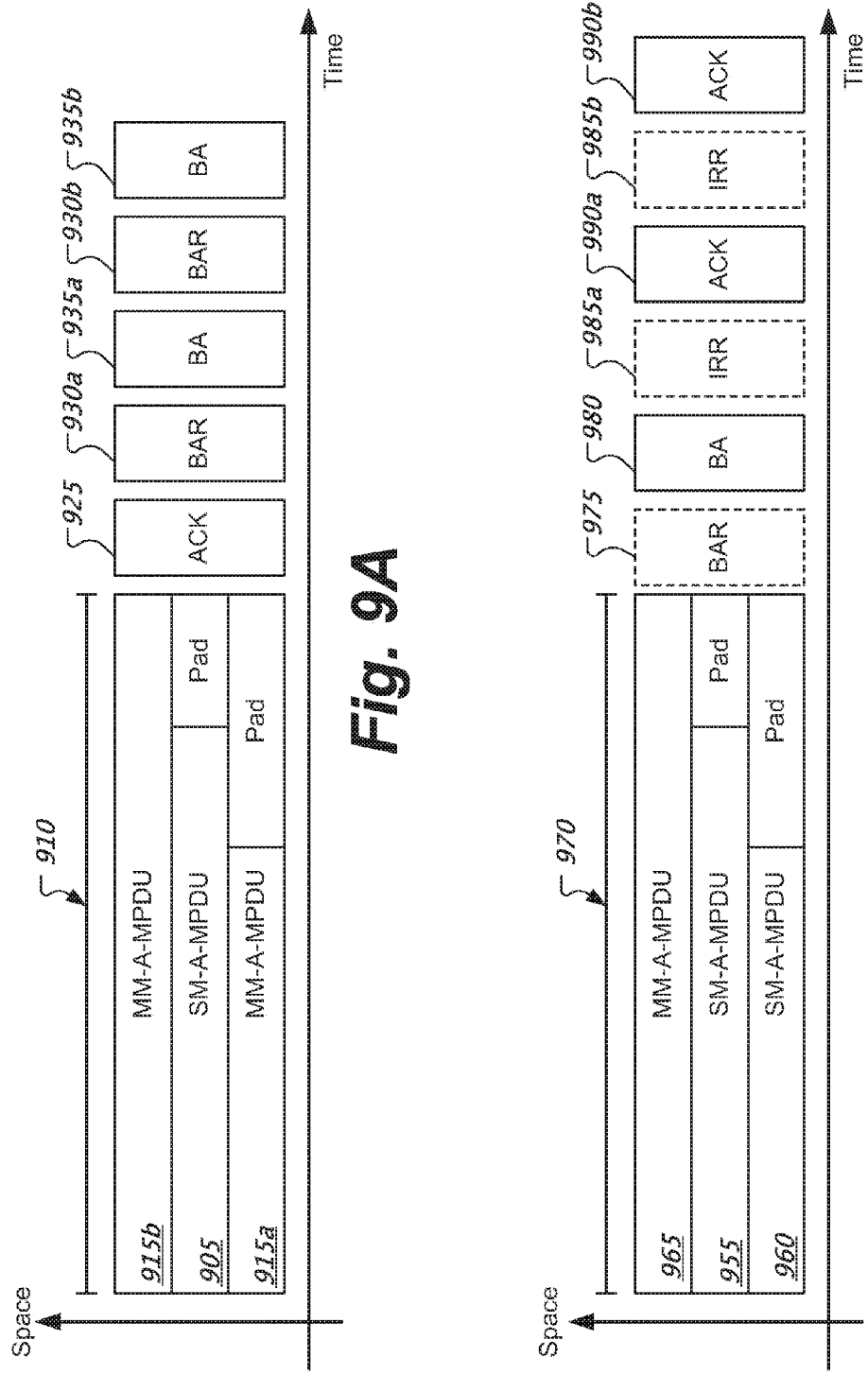

FRAME PADDING FOR WIRELESS COMMUNICATIONS

CROSS REFERENCE TO RELATED APPLICATIONS

This disclosure is a continuation of and claims the benefit of priority to U.S. patent application Ser. No. 13/830,672, filed Mar. 14, 2013 and entitled "Frame Padding for Wireless Communications" (now U.S. Pat. No. 9,237,597), which is a continuation of and claims the benefit of priority to U.S. patent application Ser. No. 12/964,584, filed Dec. 9, 2010 and entitled "Frame Padding for Wireless Communications" (now U.S. Pat. No. 8,400,968), which claims: the benefit of the priority of U.S. Provisional Application Ser. No. 61/347,144, filed May 21, 2010 and entitled "11ac Frame Padding"; the benefit of the priority of U.S. Provisional Application Ser. No. 61/326,499, filed Apr. 21, 2010 and entitled "11ac Frame Padding"; and the benefit of the priority of U.S. Provisional Application Ser. No. 61/285,112, filed Dec. 9, 2009 and entitled "11ac Frame Padding." All of the above identified applications are incorporated herein by reference in their entirety.

BACKGROUND

This disclosure relates to wireless communication systems, such as Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as orthogonal frequency division multiplexing (OFDM). In an OFDM based wireless communication system, a data stream is split into multiple data substreams. Such data substreams are sent over different OFDM subcarriers, which can be referred to as tones or frequency tones. WLANs such as those defined in the Institute of Electrical and Electronics Engineers (IEEE) wireless communications standards, e.g., IEEE 802.11a, IEEE 802.11n, or IEEE 802.11ac, can use OFDM to transmit and receive signals.

Wireless communication devices in a WLAN can use one or more protocols for medium access control (MAC) and physical (PHY) layers. For example, a wireless communication device can use a Carrier Sense Multiple Access (CSMA) with Collision Avoidance (CA) based protocol for a MAC layer and OFDM for the PHY layer.

Some wireless communication systems use a single-in-single-out (SISO) communication approach, where each wireless communication device uses a single antenna. Other wireless communication systems use a multiple-in-multiple-out (MIMO) communication approach, where a wireless communication device, for example, uses multiple transmit antennas and multiple receive antennas. A MIMO-based wireless communication device can transmit and receive multiple spatial streams over multiple antennas in each of the tones of an OFDM signal.

SUMMARY

The present disclosure includes systems and techniques for wireless communications.

According to an aspect of the present disclosure, a technique for wireless communications includes obtaining data for a transmission to a wireless communication device(s) via a physical (PHY) frame, including one or more medium access control (MAC) data units, such as MAC protocol data units (MPDUs), that encapsulate the data in a physical (PHY) frame, determining a length of a MAC layer pad based on a number of symbols associated with the PHY frame, including, in response to the length of the MAC layer pad being greater than zero, the MAC layer pad in the PHY frame after the one or more MAC data units, determining a length of a PHY layer pad based on remaining available bits in the PHY frame, including, in response to the length of the PHY layer pad being greater than zero, the PHY layer pad in the frame after the MAC layer pad, and transmitting the PHY frame to the wireless communication device(s).

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Details of one or more implementations are set forth in the accompanying drawings and the description below. Other features and advantages may be apparent from the description and drawings, and from the claims.

DRAWING DESCRIPTIONS

Figure 8A:
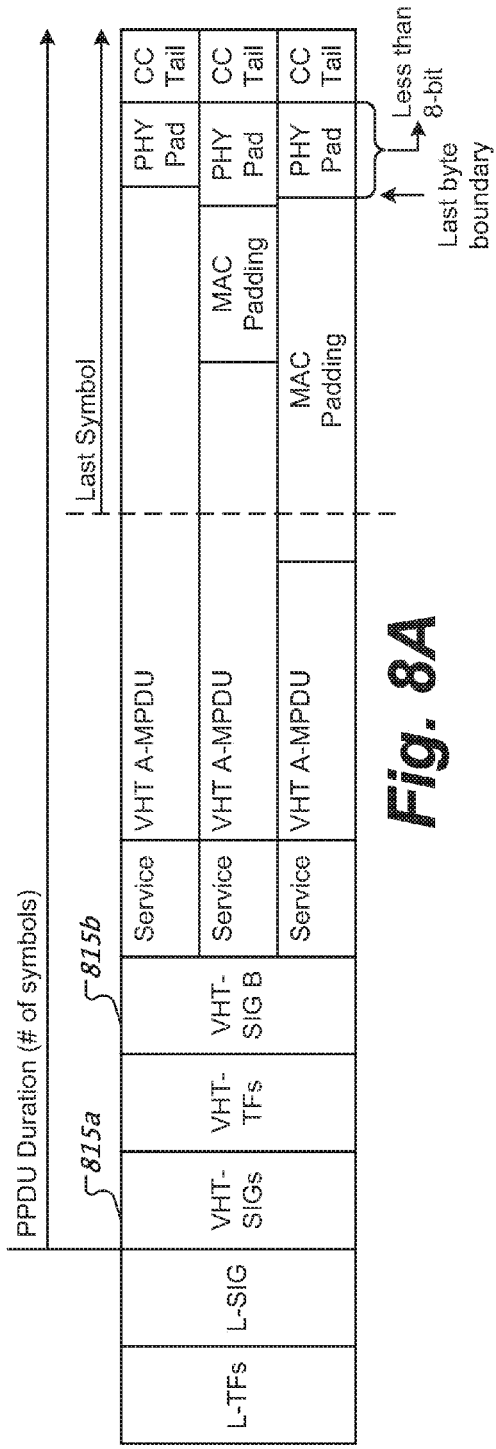
Figure 8B:
Figure 8C:
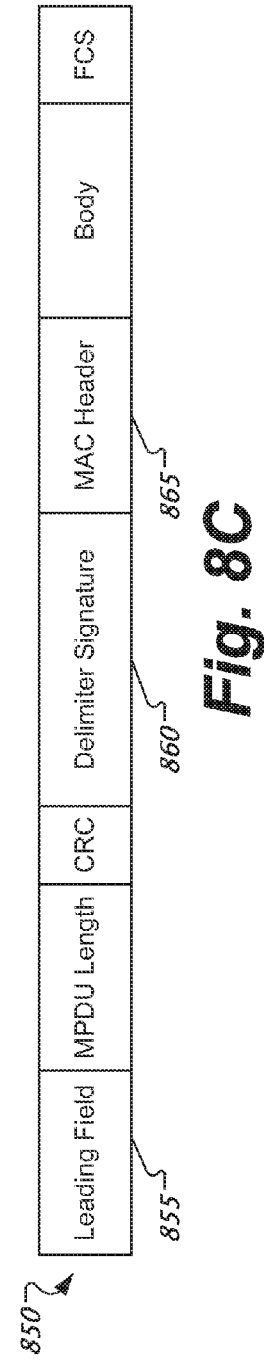

FIGS. 8A, 8B, and 8C show an example of communication flow layout associated with reduced block acknowledgement overhead.

FIGS. 9A and 9B show examples of a multi-user frame transmission layout and associated acknowledgement responses.

Figure 10:
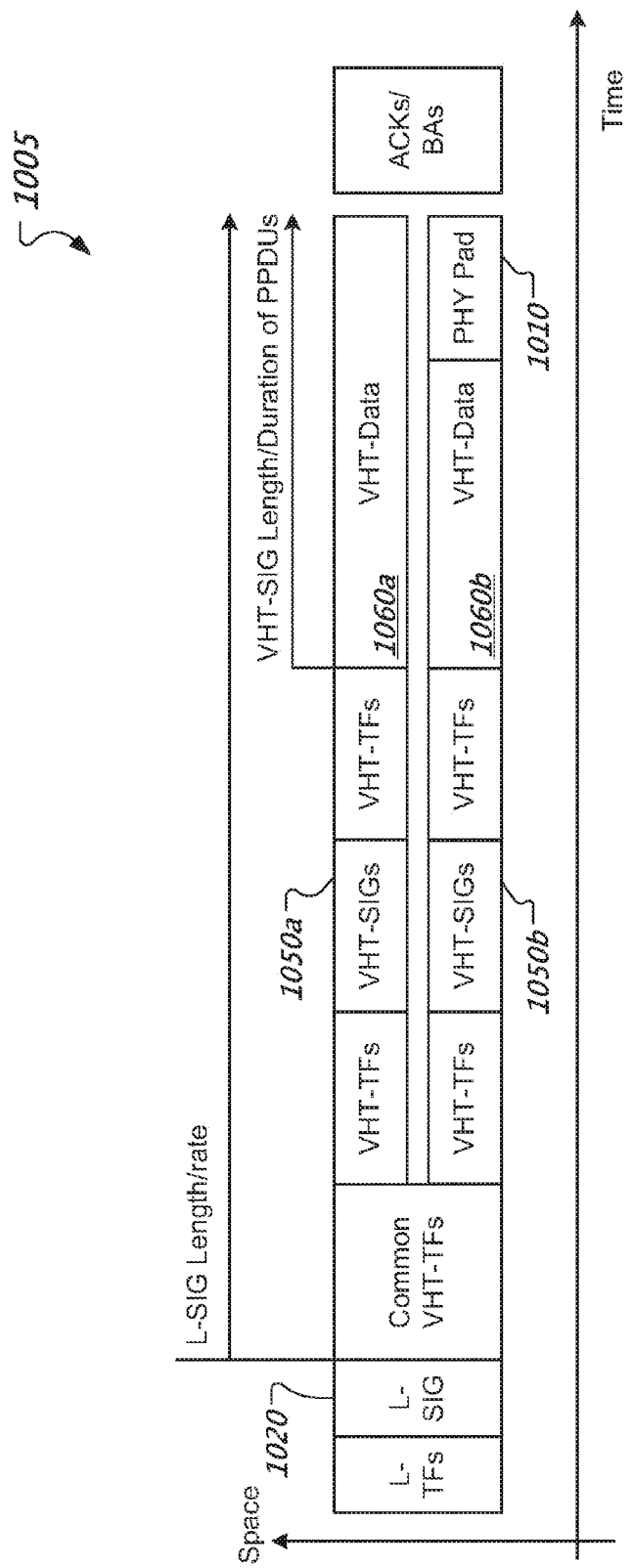

FIG. 10 shows another example of a spatial communication flow layout.

Figure 11:
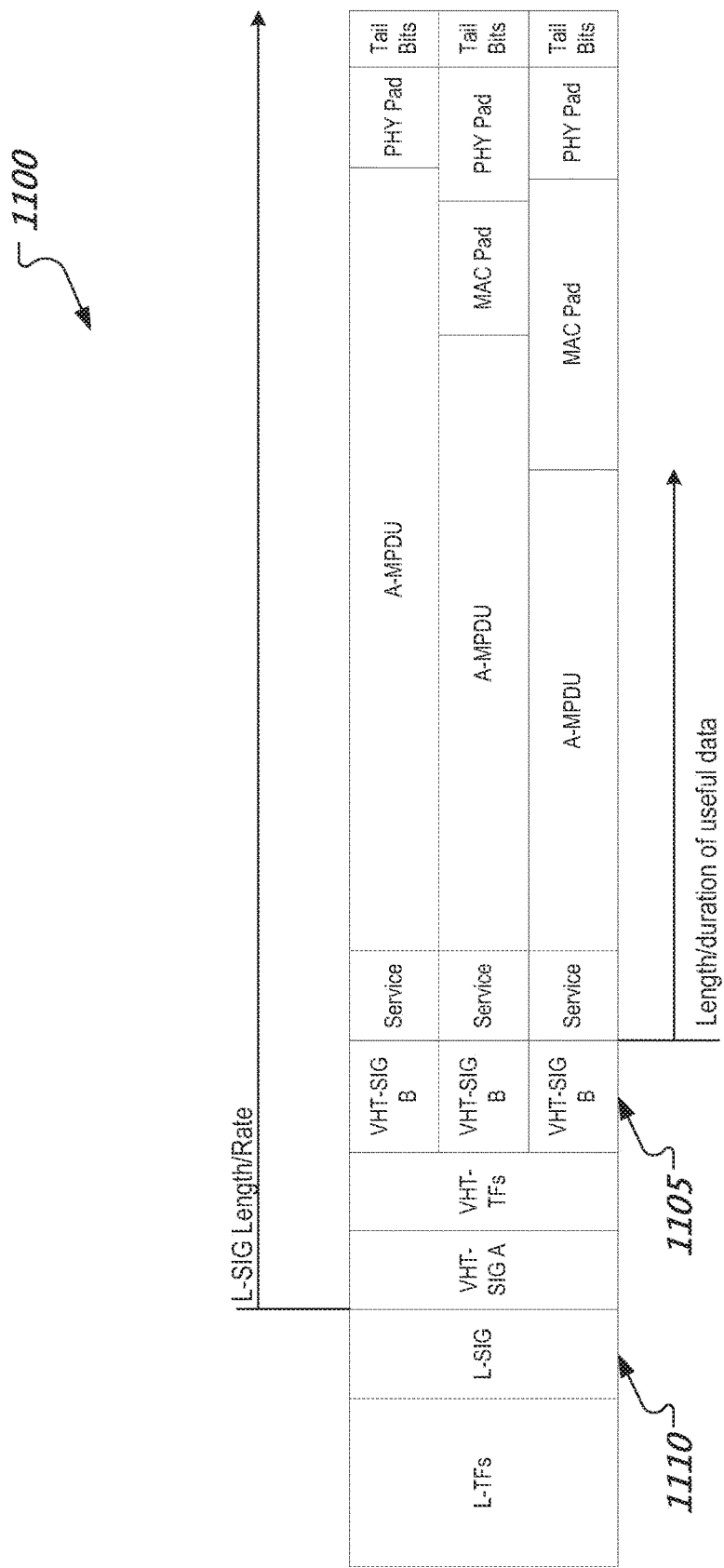

FIG. 11 shows another example of a spatial communication flow layout.

Like reference symbols in the various drawings indicate like elements.

DETAILED DESCRIPTION

This disclosure provides details and examples of technologies for wireless local area networks, including systems and techniques for including frame padding in wireless transmissions and processing received transmissions that include frame padding. An example of a frame padding technique includes operating a wireless communication device to determine MAC layer padding and PHY layer padding based on the number of symbols required to transmit the frame, Potential advantages of one or more of the described technologies can include an increased system bandwidth, backwards compatibility with older standards, or both. The techniques and architectures presented herein can be implemented in a variety of wireless communication systems such as ones based on IEEE 802.11ac.

Figure 1:
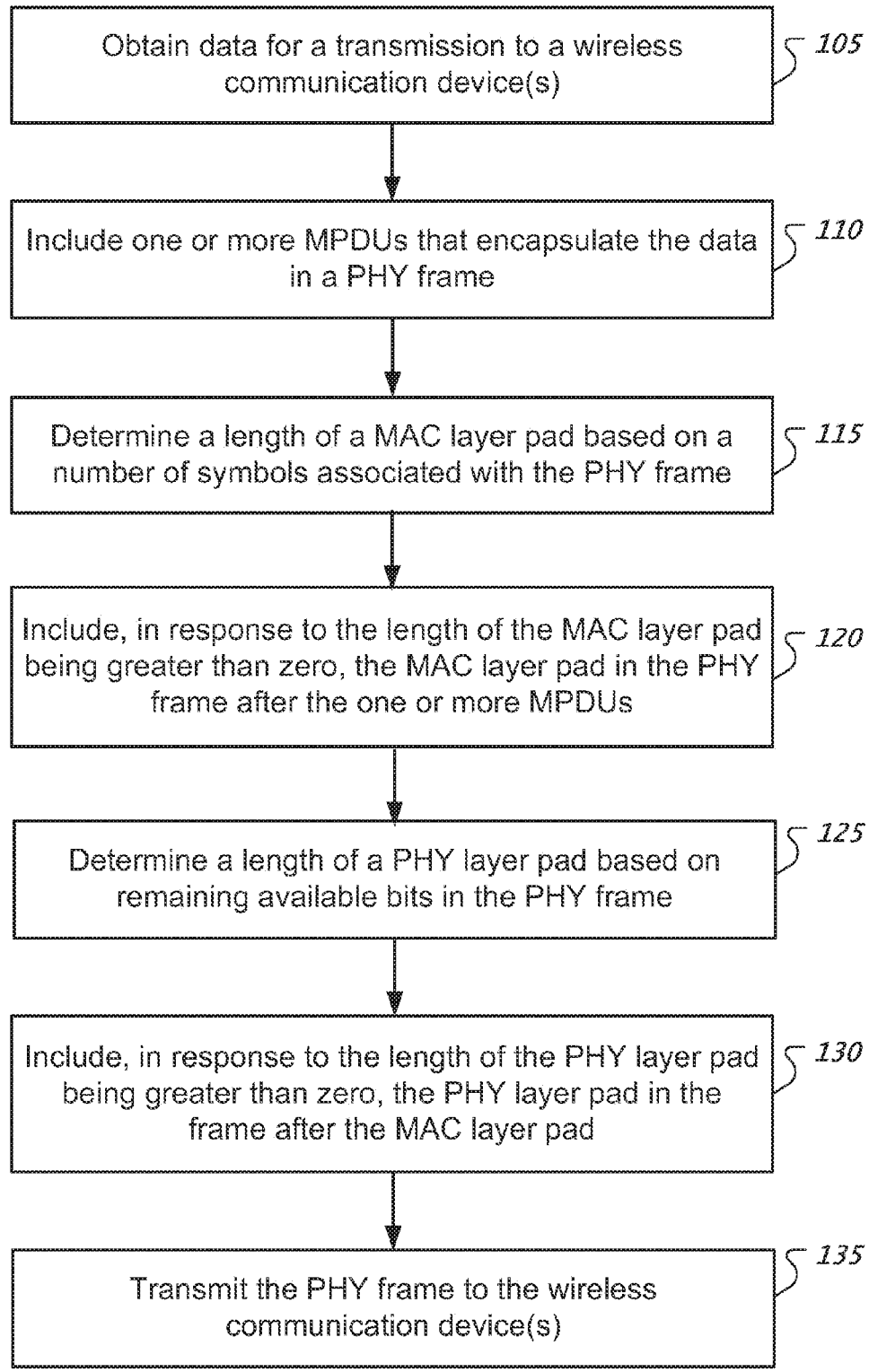
FIG. 1 shows an example of a communication process based on a frame padding technique.

FIG. 1 shows an example of a communication process based on a frame padding technique. A communication process implemented by a device such an access point device or a client device can selectively include frame padding in a transmission. The inclusion of frame padding can be determined based on a number of symbols required for transmission. At 105, the communication process obtains data for a transmission to a wireless communication device(s). Obtaining the data for a transmission can include receiving data for two or more wireless communication devices from two or more sources such as applications, servers via a network, or storage devices. In some implementations, the communication process arranges obtained data for transmission based on a Space Division Multiple Access (SDMA) technique to concurrently transmit data to multiple devices. At 110, the process includes one or more MPDUs that encapsulate the data in a PHY frame. Based on the obtained data, a MAC layer can generate an aggregated MPDU (A-MPDU) that includes the one or more MPDUs and associated one or more MPDU delimiters. A PHY layer can include the A-MPDU into the PHY frame. In some implementations, the size of a MPDU delimiter is 4 octets. The PHY frame can include two or more spatially steered frames, with respective A-MPDUs, that are intended for two or more devices.

The communication process, at 115, determines a length of a MAC layer pad based on a number of symbols associated with the PHY frame. A MAC layer can generate the one or more MPDUs and the MAC layer pad. In some implementations, a PHY layer can reduce the length of the MAC layer pad to reduce a number of symbols required for the PHY frame. In some implementations, a MAC layer can determine a MAC layer pad based on a 4-octet boundary. A PHY layer, if required, can adjust the MAC layer pad based on a symbol boundary associated with the PHY frame. The PHY layer can add additional PHY layer bits such as PHY pad bits and convolutional code (CC) tail bits. At 120, the process includes, in response to the length of the MAC layer pad being greater than zero, the MAC layer pad in the PHY frame after the one or more MPDUs. In some implementations, the MAC layer includes the MAC layer pad into an A-MPDU.

Including the MAC layer pad in a frame can include including one or more padding delimiters after the one or more MPDUs in an A-MPDU. A padding delimiter can be based on a MPDU delimiter format. Including the MAC layer pad in a frame can include including a MAC pad after the one or more padding delimiters. A MAC pad can be an integer number of octets in length that is less than four octets (e.g., 1, 2, or 3 octets in length, or 0 if not required). A MAC layer pad can include the one or more padding delimiters and the MAC pad. A padding delimiter can include an end-of-frame (EOF) flag to inform a wireless communication device to stop receiving a PHY frame after a corresponding padding delimiter. Based on the EOF flag, a receiving wireless communication device can shut-off receiver circuitry to reduce power consumption.

At 125, the communication process determines a length of a PHY layer pad based on remaining available bits in the PHY frame. Determining the remaining available bits in the PHY frame can include accessing a length of the PHY frame, and accessing the length of an A-MPDU and the length of PHY tail bits to determine a length of a portion of the PHY frame to be filed with a PHY layer pad. At 130, the process includes, in response to the length of the PHY layer pad being greater than zero, the PHY layer pad in the frame after the MAC layer pad. In some implementations, the communication process limits the length of the PHY layer pad to less than 32 bits. In some other implementations, the communication process limits the length of the PHY layer pad to less than 8 bits. Tail bits can be appended after the PHY layer pad.

At 135, the communication process transmits the PHY frame to the wireless communication device(s). Transmitting a PHY frame can include transmitting two or more spatially steered frames that concurrently provide data to two or more devices. The ends of the steered frames can be aligned to facilitate transmissions of a acknowledgements. One or more of the steered frames can include MAC layer padding, PHY layer padding, or both. An amount of padding can be based on a maximum length that is determined by lengths of the steered frames. In some implementations, ends of the steered frames are aligned to have the same length, which is signaled by an omni-directional PHY signaling field that is common to the steered frames.

A transmitting device can include one or more padding delimiters after a last non-zero-length A-MPDU subframe of the A-MPDU, where each of the one or more padding delimiters are four octets in length. The transmitting device can include a MAC pad after the one or more padding delimiters. A padding delimiter can indicate a MPDU length of zero. In some implementations, the MAC pad is an integer number of octets in length, which is less than four octets. In some implementations, a MAC pad can be a partial EOF padding delimiter. The MAC layer pad can include the one or more padding delimiters and the MAC pad. In some implementations, the one or more padding delimiters include an end-of-frame flag to inform a recipient device to stop receiving a remaining portion of the PHY frame.

A MAC layer pad can include a dword pad. In some implementations, a transmitting device includes a dword pad in the last non-zero-length A-MPDU subframe of the A-MPDU. At a transmitting device, a dword pad, padding delimiters, and the MAC byte pad can be added one by one whenever there are still available bytes left in the PHY frame, exclusive of the tail bits. For example, the device can add a dword pad, byte by byte, until the last A-MPDU subframe reaches a 4-byte boundary or reaches the last byte of the PHY frame. The device can add one or more padding delimiters, one-by-one, whenever the remaining bytes are larger than 4 bytes. The device, if the remaining byes are less than 4 bytes, a MAC pad can be added to fill in one or more remaining bytes. At a recipient device, a RX PHY processes the received PHY frame till the last byte of the frame, excluding tail bits, and passes the received data to a RX MAC. The RX MAC processes the received A-MPDU subframe one-by-one until detecting the EOF padding delimiter or until the remaining data after the last processed A-MPDU subframe is less than 4 bytes.

In some implementations, a transmitting device makes a MAC layer pad reach to a last 8-bit boundary of the PHY frame, exclusive of PHY tail bits in the PHY frame, and limits the length of the PHY layer pad to less than 8 bits. In some other implementations, a transmitting device makes a MAC layer pad reach to the last 32-bit boundary of the PHY frame, exclusive of PHY tail bits in the PHY frame, and limits the length of the PHY layer pad to less than 32 bits.

A wireless communication device can include circuitry to access a wireless communication interface and processor electronics configured to perform one or more techniques described herein. A wireless communication interface can include circuitry to transmit and receive wireless communication signals.

Figure 2:
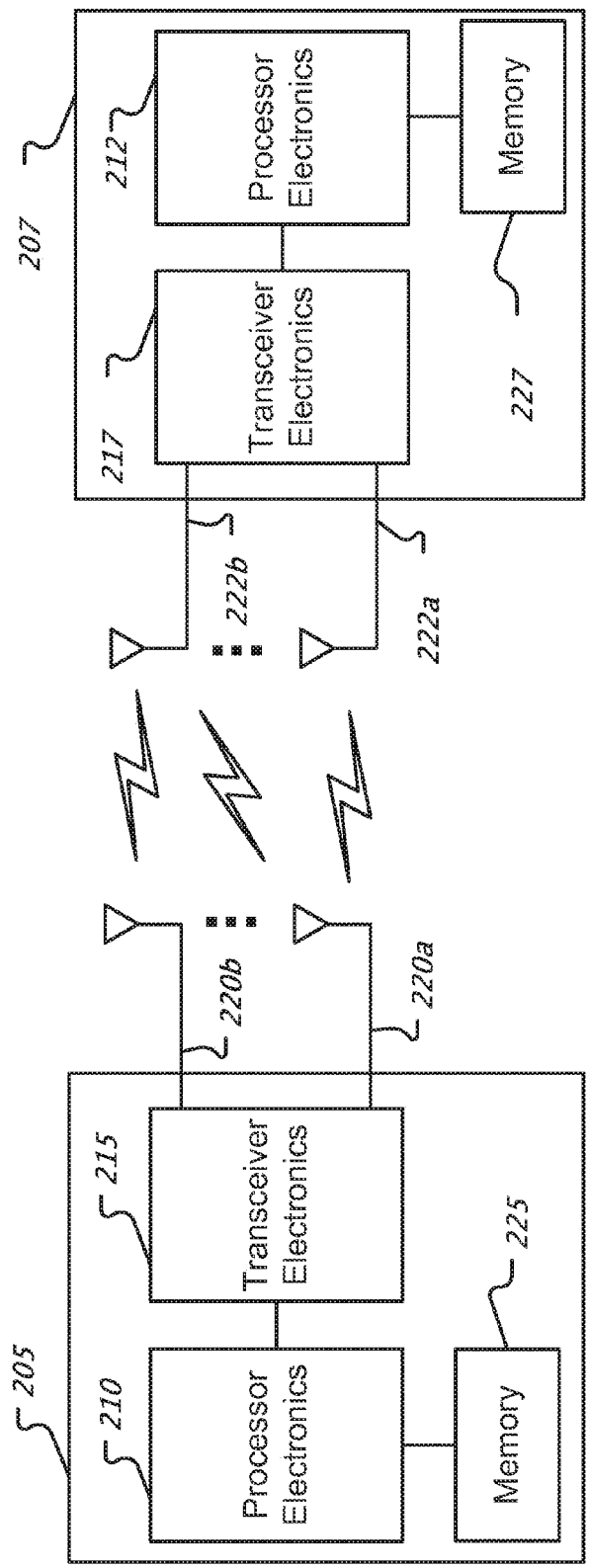
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a, 220b, 222a, 222b. Wireless communication devices 205, 207 can communicate with one or more types of devices (e.g., devices based on different wireless communication standards) such as a high-throughout (HT) device (e.g., IEEE 802.11n based device) or a very high-throughput (VHT) device (e.g., IEEE 802.11ac based device).

In some implementations, transceiver electronics 215, 217 include integrated transmitting and receiving circuitry. In some implementations, transceiver electronics 215, 217 include multiple radio units. In some implementations, a radio unit includes a baseband unit (BBU) and a radio frequency unit (RFU) to transmit and receive signals. Transceiver electronics 215, 217 can include one or more of: detector, decoder, modulator, and encoder. Transceiver electronics 215, 217 can include one or more analog circuits. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. In some implementations, a wireless communication device 205, 207 is operable to act as a serving device (e.g., an access point), or a client device.

A first wireless communication device 205 can transmit data to one or more devices via two or more spatial wireless communication channels such as orthogonal spatial subspaces, e.g., orthogonal SDMA subspaces. For example, the first wireless communication device 205 can concurrently transmit data to a second wireless communication device 207 using a spatial wireless channel and can transmit data to a third wireless communication device (not shown) using a different spatial wireless channel. In some implementations, the first wireless communication device 205 implements a space division technique to transmit data to two or more wireless communication devices using two or more spatial multiplexing matrices to provide spatially separated wireless channels in a single frequency range.

Wireless communication devices, such as a MIMO enabled access point, can transmit signals for multiple client wireless communication devices at the same time in the same frequency range by applying one or more transmitter side beam forming matrices to spatially separate signals associated with different client wireless communication devices. Based on different signal patterns at the different antennas of the wireless communication devices, each client wireless communication device can discern its own signal. A MIMO enabled access point can participate in sounding to obtain channel state information for each of the client wireless communication devices. The access point can compute spatial multiplexing matrices, such as spatial steering matrices, based on the different channel state information to spatially separate signals to different client devices.

Figure 3:
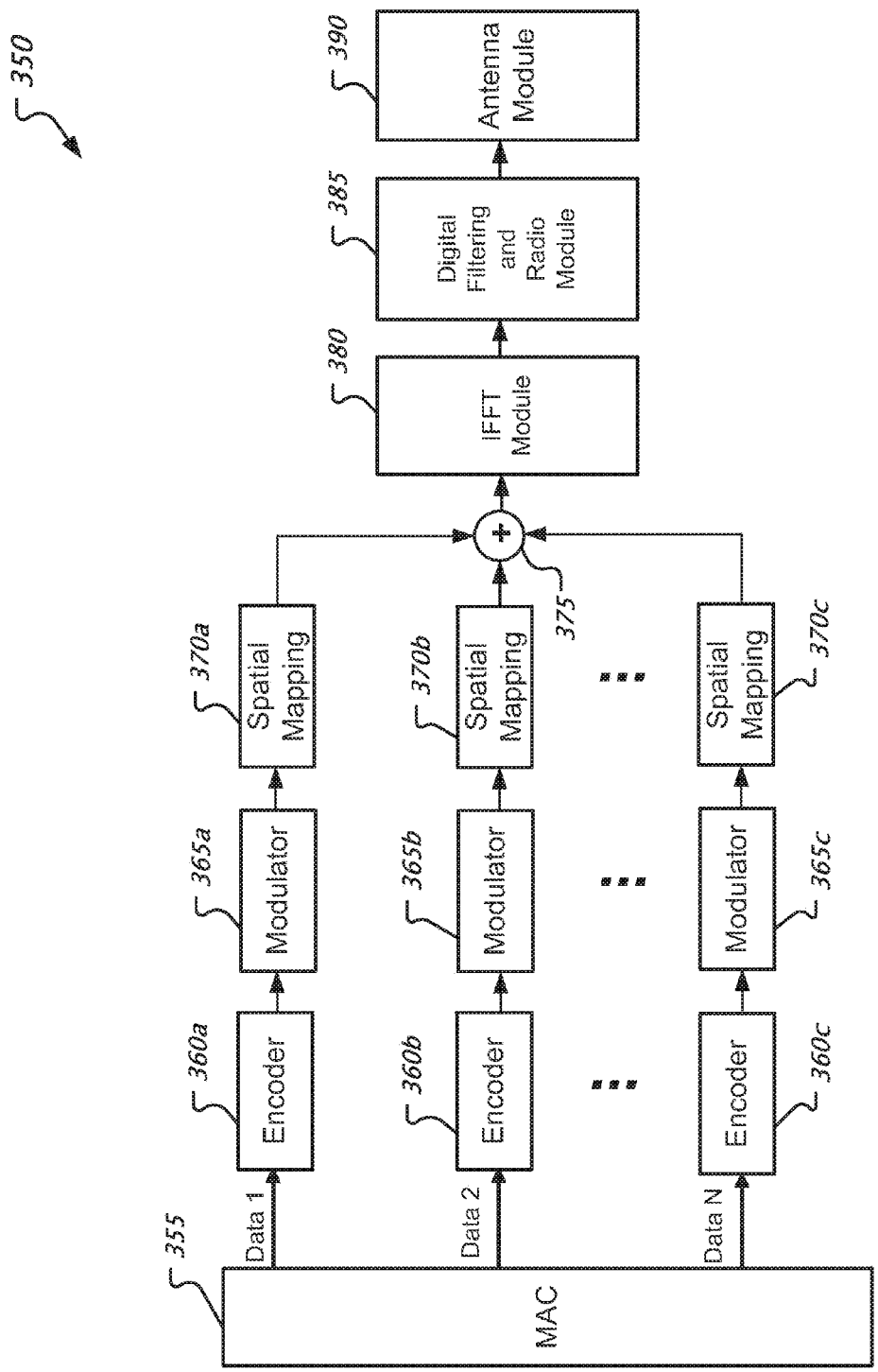
FIG. 3 shows an example of a wireless communication device architecture.

FIG. 3 shows an example of a wireless communication device architecture, which can include the various implementation details described herein. A wireless communication device 350 can produce signals for different clients that are spatially separated by respective spatial multiplexing matrices $W_i$, e.g., steering matrices. Each $W_i$ is associated with a subspace. The wireless communication device 350 includes a MAC module 355. The MAC module 355 can include one or more MAC control units (MCUs) (not shown). The wireless communication device 350 includes three or more encoders 360a, 360b, 360c that receive data streams, from the MAC module 355, for N respective client devices. The encoders 360a-c can perform encoding, such as a forward error correction (FEC) encoding technique to produce respective encoded streams. Modulators 365a, 365b, 365c can perform modulation on respective encoded streams to produce modulated streams provided to spatial mapping modules 370a, 370b, 370c.

The spatial mapping modules 370a-c can access a memory (not shown) to retrieve a spatial multiplexing matrix $W_i$ associated with a data stream's intended client device. In some implementations, the spatial mapping modules 370a-c access the same memory, but at different offsets to retrieve different matrices. An adder 375 can sum spatially steered outputs from the spatial mapping modules 370a-c.

An inverse Fast Fourier Transform (IFFT) module 380 can perform an IFFT on an output of the adder 375 to produce a time domain signal. A digital filtering and radio module 385 can filter the time domain signal and amplify the signal for transmission via an antenna module 390. An antenna module 390 can include multiple transmit antennas and multiple receive antennas. In some implementations, an antenna module 390 is a detachable unit that is external to a wireless communication device 350.

In some implementations, a wireless communication device 350 includes one or more integrated circuits (ICs). In some implementations, a MAC module 355 includes one or more ICs. In some implementations, a wireless communication device 350 includes an IC that implements the functionality of multiple units and/or modules such as a MAC module, MCU, BBU, or RFU. In some implementations, a wireless communication device 350 includes a host processor that provides a data stream to a MAC module 355 for transmission. In some implementations, a wireless communication device 350 includes a host processor that receives a data stream from the MAC module 355. In some implementations, a host processor includes a MAC module 355.

A MAC module 355 can generate a MAC Service Data Unit (MSDU) based on data received from higher level protocols such a Transmission Control Protocol over Internet Protocol (TCP/IP). A MAC module 355 can generate a MAC Protocol Data Unit (MPDU) based on a MSDU. In some implementations, a MAC module 355 can generate a Physical Layer Service Data Unit (PSDU) based on a MPDU. For example, a wireless communication device can generate a data unit (e.g., a MPDU or a PSDU) that is intended for a single wireless communication device recipient. A Physical Layer Protocol Data Unit (PPDU) can encapsulate a PSDU.

A wireless communication device 350 can perform omni-directional transmissions that are intended for multiple client devices. For example, the MAC module 355 can operate a single data pathway between the MAC module 355 and the IFFT module 380. The device 350 can perform steered transmissions that concurrently provide separate data to multiple client devices. The device 350 can alternate between omni-directional transmissions and steered transmissions. In steered transmissions, the device 350 can transmit a first PPDU to a first client via a first spatial wireless channel and concurrently transmit a second PPDU to a second client via a second spatial wireless channel.

With respect to the following figures, transmission signals can include one or more legacy training fields (L-TFs) such as a Legacy Short Training Field (L-STF) or Legacy Long Training Field (L-LTF). Transmission signals can include one or more Legacy Signal Fields (L-SIGs). Transmission signals can include one or more VHT Signal Fields (VHT-SIGs). Transmission signals can include one or more VHT training fields (VHT-TFs). Examples of such training fields include a VHT Short Training Field (VHT-STF) and a VHT Long Training Field (VHT-LTF). Transmission signals can include different types of data fields such as VHT-Data fields.

Figure 4:
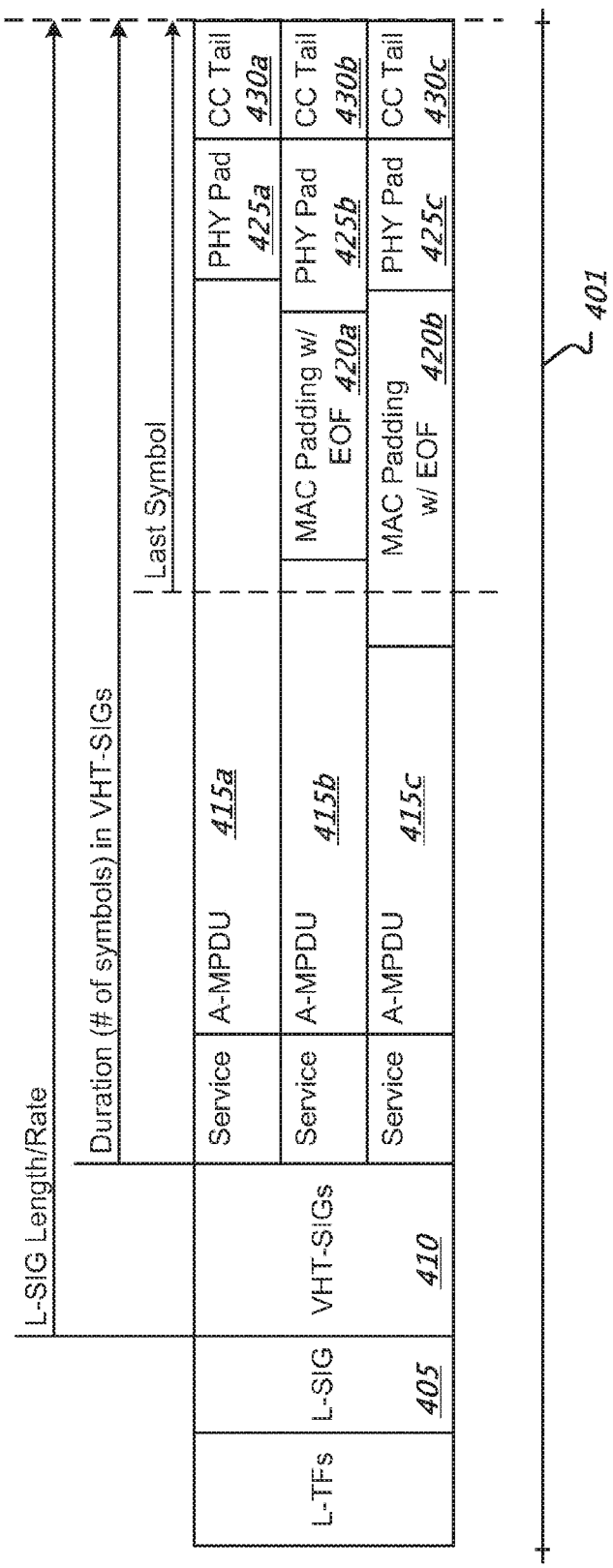
FIG. 4 shows an example of a spatial communication flow layout that includes MAC padding with end-of-frame signaling.

FIG. 4 shows an example of a spatial communication flow layout that includes MAC padding with end-of-frame signaling. In a SDMA based transmission, a SDMA enabled device transmits VHT-Data segments to three recipient devices via three spatial channels, respectively. VHT-Data segments include respective aggregated MPDUs (A-MPDUs) 415a, 415b, and 415c. A-MPDUs 415a-c each include one or more subframes.

Prior to transmitting the A-MPDUs 415a-c, the SDMA enabled device transmits a L-SIG 405 and one or more VHT-SIGs 410 to the recipient devices. The L-SIG 405 includes information that indicates a remaining duration of a PHY frame 401 (e.g., the number of symbols from the end of the L-SIG 405 to the end of a PPDU). For example, a client device can determine the end of the frame 401 based on a length field and rate field included in the L-SIG 405. The end of the frame 401 is based on the longest VHT-Data segments in the SDMA based transmission. Note that shorter VHT-Data segments align with the length of the longest VHT-Data segment by including padding. In some implementations, a VHT-SIG 410 includes information that indicates a remaining duration of the PHY frame 401 (e.g. from the end of the VHT-SIGs 410 to the end of a PPDU). Based on the depicted communication layout, the remaining duration indicated by the VHT-SIGs 410 is shorter than the remaining duration indicated by the L-SIG 405. In some other implementations, a VHT-SIG 410 steered to a destination device indicates the length of the useful data, exclusive of the MAC layer padding, included in the A-MPDU transmitted to the destination device.

An amount of padding, if required, can be based on a remaining symbol duration, which is indicated by the L-SIG 405, the VHT-SIGs 410, or both. The transmitting device, if required, inserts MAC padding 420a, 420b after an end of an A-MPDU 415b, c. An A-MPDU can include MAC padding. MAC padding 420a, b can include end-of-frame (EOF) signaling such as one or more EOF padding delimiters. A padding delimiter can be based on a MPDU delimiter format. In some implementations, an EOF padding delimiter includes an EOF flag, a MPDU length field that is set to zero, a checksum, and a delimiter signature.

If required, the AP device inserts PHY padding 425a, 425b, 425c after an end of the A-MPDU 415a-c, or, if present, after an end of the MAC padding 420a, b. After the PHY padding 425a-c, the AP inserts tail bits such as convolutional code (CC) tail bits 430a, 430b, 430c. Based on an unpadded A-MPDU not reaching to a point within the last symbol of the frame 401, the AP device inserts MAC padding 420a, 420b after the end of an unpadded A-MPDU 415b, c. Based on the PHY padding 425b, c, and tail bits 430b, c for client device communications in the frame 401, the position of the point can be different for each client device communication. Thus, the amounts of MAC padding 420a, b for respective client device communications in the frame 401 can be different.

Determining whether to add padding can include checking whether the end of the last subframe of an A-MPDU, exclusive of MAC layer padding 420a, 420b, plus CC tail bits 430b, 430c is within the end of a last symbol boundary determined by a L-SIG 405 duration field, a VHT-SIG 410 duration field, or both. In one padding technique, a TX MAC layer can pad an A-MPDU to a 32-bit boundary, e.g. pad the last A-MPDU subframe to a 32-bit boundary, keep adding padding delimiters until no more padding delimiters can be added, or both. Based on the A-MPDU, which may include padding, the TX PHY layer appends a PHY pad, which is less than 32 bits, and PHY tail bits to extend the data to the last symbol boundary. In some implementations, a TX MAC layer can pad the last A-MPDU subframe of the A-MPDU to a 32-bit boundary, keep adding padding delimiters until all available bits in the corresponding PPDU are filled, or both. Based on the MAC layer pad extending the A-MPDU to a 32-bit boundary, the A-MPDU plus PHY tail bits may exceed the last symbol boundary. The TX PHY layer can reduce the size of MAC layer padding until MAC layer padding, a PHY pad, and PHY tail bits 430 fit in the last symbol boundary of a frame.

Figure 5:
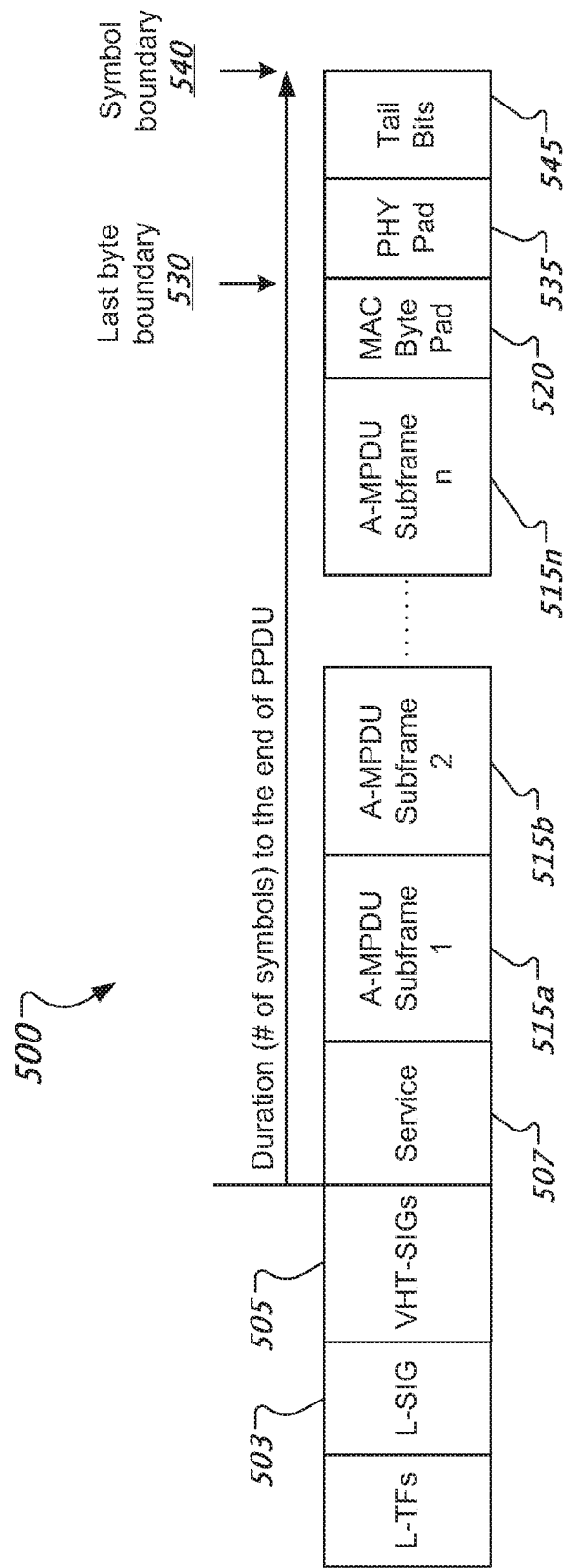
FIG. 5 shows an example of a transmission layout that includes MAC and PHY layer padding.

FIG. 5 shows an example of a transmission layout that includes MAC and PHY layer padding. A device can produce a transmission, which includes a PPDU 500 which was generated via multiple protocol layers, including a MAC layer and a PHY layer. The PPDU 500 includes an A-MPDU, which contains multiple subframes 515a, 515b, 515n. For transmission, a TX MAC layer appends a MAC layer pad such as a MAC byte pad 520 to the end of the last subframe 515n of the A-MPDU to pad to the end of the last byte boundary 530 in the PPDU exclusive of the tail bits. In some cases, the last subframe 515n of the A-MPDU can include a padding delimiter; and, in some cases, one or more subframes preceding the last subframe 515n can include a padding delimiter. Based on a TX MAC layer output, a TX PHY layer appends data bits to the end of the MAC byte pad 520 to fill to the end of a symbol boundary 540, which is determined by a VHT-SIG 505 duration field. In this example, the TX PHY layer appends a PHY pad 535 after the end of the MAC byte pad 520 and appends tail bits 545 after the end of the PHY pad 535. The size of the PHY pad 535 can be up to 7 bits in length (e.g., less than one byte in length); note that the A-MPDU, together with a service field 507 and tail bits 545, can occupy all available bytes in a PHY payload. In another example based on a different ordering, the TX PHY layer appends tail bits after the end of the MAC byte pad and appends a PHY pad after the end of the tail bits. The combined size of the MAC byte pad 520 and the PHY pad 535 can be less than 32 bits. The size of the MAC pad 520 can be 1, 2, or 3 octets in length.

A transmitting device can determine whether to add padding based on one or more conditions. Determining whether to add padding can include checking whether the end of the last subframe 515n of an A-MPDU, exclusive of MAC layer padding, plus tail hits 545 is within the end of the last symbol boundary 540 determined by a L-SIG 503 duration field or a VHT-SIG 505 duration field. In some implementations, a TX MAC layer can pad the last A-MPDU subframe 515n to a 32-bit boundary and pass the A-MPDU to a TX PHY layer. In some implementations, the TX PHY layer can reduce the size of MAC byte pad 520 until the MAC byte pad 520, PHY pad 535, and tail bits 545 extend to the last symbol boundary 540. In some other implementations, the TX PHY layer removes one or more padding bits that extend past the end of the last symbol boundary 540 less the length of the tail bits 545, and then adds the tail bits 545.

During a reception of the transmission 500, a RX PHY layer passes transmission data to a RX MAC layer until the last byte boundary 530. The RX PHY layer disregards the remaining content of the transmission 500, e.g., PHY pad 535 and tail bits 545. In the RX MAC layer, the end of the last A-MPDU subframe 515n can be determined by the length in the delimiter of the last A-MPDU subframe 515n. Based on the determined end, the RX MAC layer removes the remaining content e.g., MAC byte pad 520. In some implementations, a RX PHY layer passes received data to a RX MAC layer in 32-bit units until the remaining bits (excluding tail bits) are less than 8 bits or until the bits in the last symbol are exhausted. In some implementations, a RX MAC layer identifies the end of the last A-MPDU subframe based on the length in the delimiter of the last subframe 515n.

Figure 6:
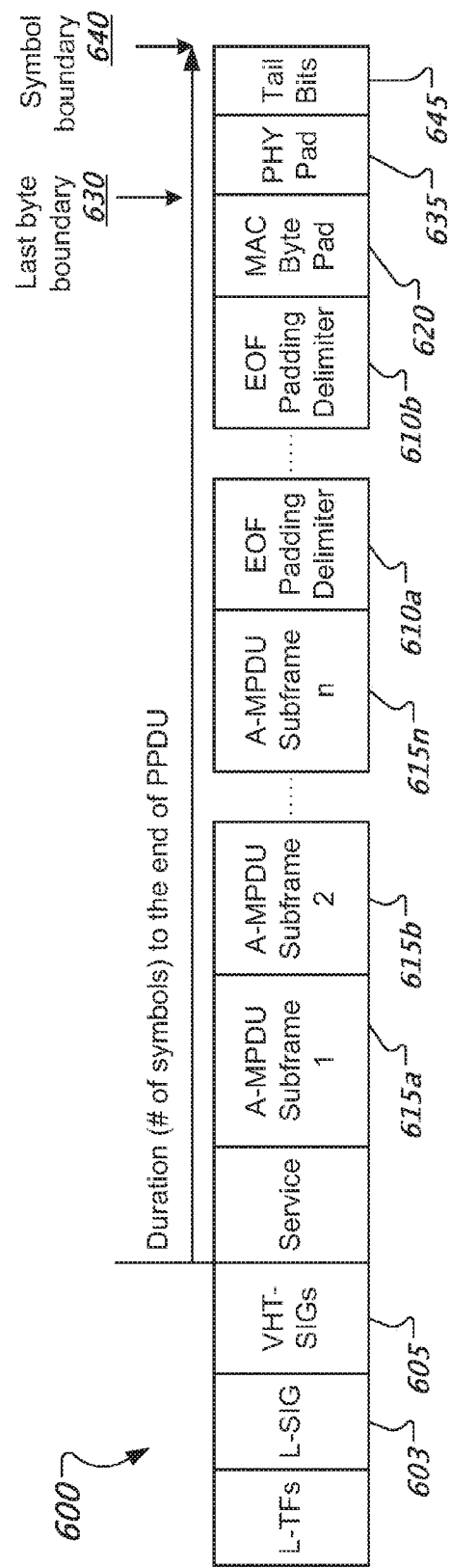
FIG. 6 shows an example of a transmission layout that includes MAC and PHY layer padding and end-of-frame signaling.

FIG. 6 shows an example of a transmission layout that includes MAC and PHY layer padding and end-of-frame signaling. A device can produce a transmission 600 that includes a MAC layer pad that contains EOF padding delimiters 610a, 610b and a MAC byte pad 620. The transmission 600 includes an A-MPDU, which contains multiple subframes 615a, 615b, 615n. For transmission, a TX MAC layer appends one or more EOF padding delimiters 610a, 610b and a MAC byte pad 620 after the end of the last subframe 615n of the A-MPDU to pad to the end of the last byte boundary 630, exclusive of PHY tail bits 645. The MAC byte pad 620 is included after the last padding delimiter 610b. In some implementations, an EOF flag is added to a delimiter of the last A-MPDU subframe 615n. In some implementations, each subframe 615a, 615b, including the last subframe 615n, in an A-MPDU is padded to a 32-bit boundary; this padding is called a dword pad, which can be 0, 1, 2, or 3 bytes in length. The dword pad added to the end of the last A-MPDU subframe 615n can be considered as a part of the MAC layer pad.

The TX PHY layer appends a PHY pad 635, which is typically less than one byte, to the end of the MAC byte pad 620 and appends tail bits 645 after the end of the PHY pad 635. The size of the PHY pad 635 is based on the symbol boundary 640 determined by a PHY signaling duration field, such as a L-SIG 603 duration field or a VHT-SIG 605 duration field, and additional PHY layer bits such as tail bits that are to be included into the transmission 600.

Based on a reception of the transmission 600, a RX PHY layer passes transmission data to a RX MAC layer until the last byte boundary 630. The RX PHY layer removes the remaining content of the transmission 600, e.g., PHY pad 635 and tail bits 645, before passing data to the RX MAC layer. The RX MAC layer detects and removes the EOF padding delimiters 610a, 610b. For example, once the RX MAC layer detects an EOF padding delimiter, the RX MAC layer can discard the remaining received data after the EOF padding delimiter and can signal the RX PHY layer to stop receiving immediately to save power. In some cases, the RX MAC layer removes the MAC byte pad 620. In some implementations, a received A-MPDU is processed, in multiples of 32-bits, until a remaining part is less than 32 bits. If the remaining part is not covered by either an A-MPDU subframe or a padding delimiter, the remaining part (e.g., MAC byte pad 620) is removed.

In some implementations, the last A-MPDU subframe in an A-MPDU can include a dword pad and one or more EOF padding delimiters. In this case, the MAC pad extends the A-MPDU to a 32-bit boundary. A device can determine the size of a MAC pad based on one or more MAC padding rules. In a 32-bit boundary based MAC padding rule, the MAC pad is added to extend the last A-MPDU subframe to the last 32-bit boundary. At a receiving end, a RX PHY layer can pass received bits, excluding tail bits, to a RX MAC layer using a 32-bit interface. The RX MAC layer, based on detecting an EOF delimiter in a MPDU, or detecting a padding delimiter, can remove the bits that follow the MPDU or the padding delimiter. If an EOF delimiter is not detected, the RX MAC layer can disregard the last received 32-bit not covered by an A-MPDU subframe.

In an 8-bit boundary based MAC padding rule, a MAC pad is added to extend the last A-MPDU subframe to the last 8-bit boundary. The device can include an EOF flag in the last subframe based on the last A-MPDU subframe (including the last EOF padding delimiter) not reaching a 32-bit boundary. At a receiving device, a RX PHY layer can pass received bits till the last 8-bit boundary to a RX MAC layer. The RX MAC layer can process bits received from a RX PHY layer until the remaining bits are less than 8-bits. The RX MAC layer can disregard the remaining bits.

A device can signal the presence of an extended length PHY frame based on a combination of fields in different locations in a PHY frame. For example, a device can include, in a first PHY signaling field (e.g., a L-SIG field), information to indicate a first length of the PHY frame, and include, in a second PHY signaling field (e.g., a VHT-SIG field), information to indicate a second length of the PHY frame. The second PHY signaling field can be used to indicate an end of useful data in a PHY frame for a recipient device.

Figure 7:
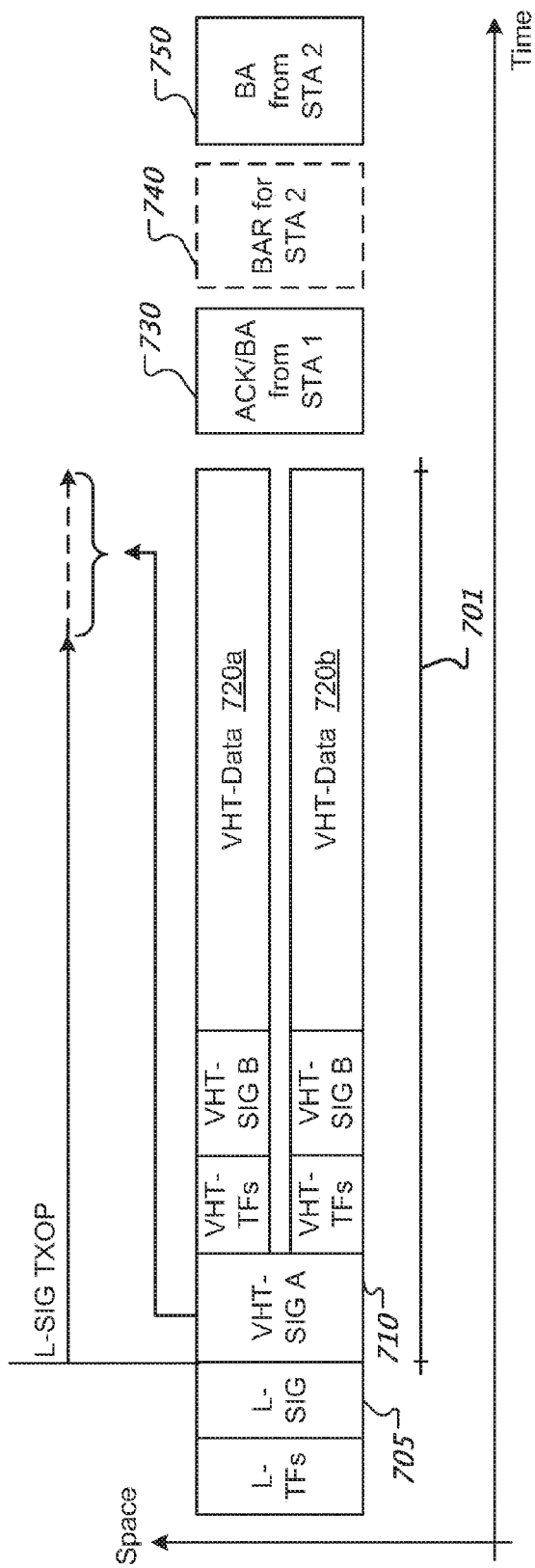
FIG. 7 shows an example of a spatial communication flow with long data unit signaling and acknowledgements.

FIG. 7 shows an example of a spatial communication flow with long data unit signaling and acknowledgements. A L-SIG 705 includes a rate field and a length field (L_LENGTH). Based on the L-SIG 705 rate field indicating a data rate of 6 Mbps, binary phase-shift keying (BPSK) modulation, and code rate, there are 3 octets per symbol, which provides for a max L-SIG duration of 5.464 ms. Following the L-SIG 705, a VHT transmission can include a VHT-SIG-A 710 that signals a presence of a PPDU longer than 5.464 ms, e.g., a VHT PPDU 701.

A VHT-SIG-A 710, in some implementations, includes an extended length (E_LENGTH) subfield to indicate a presence of a PPDU longer than 5.464 ms. Based on a L_LENGTH and E_LENGTH, a VHT PPDU duration can be expressed by:

$$\left(1 + \left\lceil \frac{L\_LENGTH + E\_LENGTH}{3} \right\rceil\right) \times 4 \ \mu s.$$

For example, based on a 2-bit format for an extended length subfield, the length signaling bits of a PPDU are extended to 14 bits, which can indicate a max duration of 21.85 ms. However, a legacy device may be only able to decode the L-SIG 705 of the transmission. If the PPDU duration is larger than 5.464 ms, a clear-to-send (CTS) message can be transmitted before the long PPDU transmission (e.g., longer than 5.464 ms) to prevent legacy devices from transmitting during the long PPDU transmission.

In some other implementations, VHT-SIG-A 710 includes a "Long PPDU" subfield, which can be 1-bit, to indicate a long PPDU. The "Long PPDU" subfield can be set to indicate a long PPDU duration (e.g., a PPDU duration being greater than 5.464 ms). Based on the "Long PPDU" subfield indicating a long PPDU, a length field in the L-SIG 705 can be set based on a rate lower than 6 Mbps (e.g. 2 Mbps or 1 Mbps), while the rate field in L-SIG 705 is set as 6 Mbps. A VHT device, which is capable of processing a long PPDU, can calculate a PPDU duration based on the L-SIG 705 length field. For example, the VHT device can calculate a VHT PPDU duration based on (1+L_LENGTH)×4 μs, where L_LENGTH denotes a value in the L-SIG 705 length field. A message such as a CTS-to-Self can be transmitted before the long PPDU transmission (e.g., longer than 5.464 ms) to prevent legacy devices from transmitting during the long PPDU transmission. Other long PPDU signaling techniques are possible.

An AP can use an implicit ACK policy to cause a first client (e.g., STA 1) to transmit an acknowledgement response 730 (e.g. block acknowledgement (BA) or an acknowledgement (ACK)) based on successfully receiving, via a spatial wireless channel, a VHT-Data segment 720*a*, which can include a MAC header and a MAC payload. An AP can transmit a block acknowledgement request (BAR) 740 to a second client (e.g., STA 2). Based on the BAR 740 and successfully receiving, via a spatial wireless channel, a VHT-Data segment 720*b*, which can include a MAC header and a MAC payload, the second client sends an acknowledgement response such as a block acknowledgement 750. In some implementations, an AP can initiate a BA with multiple Block ACK capable SDMA clients by using an Add Block Acknowledgement (ADDBA) request and response exchange.

A wireless communication system can use BA for acknowledgement of one or more received MPDUs. A BA agreement setup and BA management can be required. At a transmitting device, a BA queue is used for an active BA stream. At a receiving device, a scoreboard and reordering buffer are used for an active BA stream. A wireless communication system can provide one or more mechanisms to reduce BA overhead for frames such as management frames and A-MPDUs with a single MPDU.

FIG. 8A shows an example of communication flow layout associated with reduced BA overhead. A VHT device can transmit two or more VHT A-MPDUs to two or more respective VHT devices via two or more spatial wireless channels. Transmitted before a VHT A-MPDU, a VHT-SIG 815*a*, 815*b* can include a field that indicates whether a VHT A-MPDU is an A-MPDU with a single MPDU (SM-A-MPDU). Rather than using signaling in a VHT-SIG, some implementations can configure a device to detect a SM-A-MPDU based on a lack of detecting a delimiter before detecting a MAC pad.

FIG. 8B shows an example of an A-MPDU layout associated with reduced BA overhead. In this example, a device includes one or more null subframes 845, such as an EOF padding delimiter, after a single A-MPDU subframe 835 to indicate that the A-MPDU 830 has a single non-zero length MPDU (e.g., SM-A-MPDU). In some cases, the device can include a first MAC pad 840 after the A-MPDU subframe 835 to make the A-MPDU subframe 835 reach a 32-bit boundary and before the one or more null subframes 845, e.g., padding delimiters. The device can include a second MAC pad 841 after the one or more null subframes 845. The MAC pads 840, 841, if present, can be 1, 2, or 3 octets in length. MAC layer padding can include the first and second MAC pads 840, 814, and the one or more null subframes 845.

FIG. 8C shows an example of an A-MPDU subframe layout associated with reduced BA overhead. A-MPDU subframe 850 can include signaling to indicate that the A-MPDU 830 has a single MPDU (e.g., SM-A-MPDU). In some implementations, SM-A-MPDU signaling uses a 1-bit field in a leading field 855 of an A-MPDU subframe 850. In some other implementations, SM-A-MPDU signaling can reuse the EOF bit in the delimiter to indicate that an A-MPDU is a SM-A-MPDU, with the EOF flag being set to 1 and the MPDU length being greater than 0. In some other implementations, SM-A-MPDU signaling uses a delimiter signature 860. In yet some other implementations, SM-A-MPDU signaling uses a subfield in a MAC header 865 to indicate a SM-A-MPDU.

For a SM-A-MPDU transmission, a SM-A-MPDU can be transmitted without a previously established BA agreement, e.g., an ADDBA exchange is not required. Queues other than BA queues can be used to buffer SM-A-MPDUs. An acknowledgement policy of a SM-A-MPDU can be set as Normal ACK. For receiving a SM-A-MPDU, a SM-A-MPDU can be accepted without an associated and active BA stream. Scoreboard and BA reorder buffering are not required for a SM-A-MPDU requesting Normal ACK. Based on successfully receiving a SM-A-MPDU requesting Normal ACK, an ACK can be transmitted. If an A-MPDU includes a single MPDU, but there is no indication that the A-MPDU is a SM-A-MPDU, e.g. EOF flag in the delimiter of the single MPDU is not set, and the acknowledgement policy of the MPDU is set to Normal or Implicit ACK, a BA can be transmitted. In some implementations, management frames do not have an ACK policy field and cannot request BA as acknowledgement. Therefore, a management frame can use a SM-A-MPDU format to request ACK as acknowledgement.

FIG. 9A shows an example of a multi-user frame transmission layout and associated acknowledgement responses. In this example, only one SM-A-MPDU 905 is included in a multi-user (MU) frame 910 transmission. The SM-A-MPDU 905 can be a management A-MPDU frame. The MU frame 910 can include two or more A-MPDUs with multiple MPDUs (MM-A-MPDUs 915a, 915b). The SM-A-MPDU 905 indicates a request for a single acknowledgement, instead of a BA. Therefore, the SM-A-MPDU's ACK 925 cannot be polled by a BAR frame. The recipient of the SM-A-MPDU 905 can transmit an ACK 925 immediately after a SIFS duration from the MU frame 910 without explicit polling. In this example, a MU frame 910 can include at most one SM-A-MPDU 905 because only one recipient can transmit immediately after the MU frame 910. Based on receiving BAR frames 920a, 930b, which are transmitted after the MU frame 910, the recipients of the respective BAR frames 920a, 930b can transmit BAs 935a, 935b for respective MM-A-MPDUs 915a, 915b. In some cases, the recipients of the MM-A-MPDUs 915a, 915b can transmit respective BAs 935a, 935b based on a MU response schedule after the acknowledgement transmission from the recipient of the SM-A-MPDU 905. In some implementations, a poll frame can be used to poll a single acknowledgement from a recipient of the SM-A-MPDU 905 after the MU frame 910.

An Immediate Response Request (IRR) frame can be used to poll acknowledgement responses from SM-A-MPDU recipients, e.g., polling an immediate ACK for a management frame, immediate sounding feedback frame, or immediate data frames in a SM-AMPDU format. In some cases, the response transmission may not follow the rate of the IRR frame. For example, an IRR frame can be transmitted by using a non-HT PPDU with a low rate, while sounding feedbacks can be transmitted by using high-rate HT-PPDU or a VHT-PPDU.

FIG. 9B shows a different example of a multi-user frame transmission layout and associated acknowledgement responses. In this example, two or more SM-A-MPDUs 955, 960 are included in a MU frame 970. The MU frame 970 can include one or more MM-A-MPDUs 965. An IRR frame 985a, 985b can be transmitted to poll immediate ACKs 990a, 990b from devices receiving the SM-A-MPDUs 955, 960. In this example, the recipients of SM-A-MPDUs 955, 960 do not send an ACK based on a SIFS duration after the MU frame. A BAR frame 975 can be transmitted to poll a BA 980 from a device receiving the MM-A-MPDU 965. Response types such as scheduled or sequential response can be used, e.g., a device receiving a SM-A-MPDU can send an ACK based on response schedules or sequences.

FIG. 10 shows another example of a spatial communication flow layout. A device can add a PHY pad 1010 to a PPDU to ensure that PPDUs, in a SDMA transmission 1005, have the same duration (e.g., the same number of symbols). The device can add the PHY pad 1010 to extend PHY data to the end of the last symbol boundary. L-SIG 1020 length and rate fields can be used to indicate the common end (e.g. the number of symbols from the end of the L-SIG 1020 to the end of the PPDUs) of a group of PPDUs in the SDMA transmission 1005. A steered VHT-SIG 1050a, 1050b can be set based on a size of a corresponding PSDU to assist a receiving device to determine the end of the PSDU and remove the PHY pad 1010. Based on the PSDU length, the receiving device can stop receiving at the end of the PSDU and disregard the remaining PHY pad 1010 to save power. Note that in this case, the PSDU includes the useful data, and is not required to include a MAC pad. The PHY pad 1010 covers the remaining available bits, exclusive of the tail bits, in the PPDU till the end of the last symbol boundary. The tail bits (not shown) are appended. In some implementations, tail bits can be added after the PSDU and before PHY pad.

Length and duration information of steered data units, such as steered PSDUs included in steered VHT-Data 1060a, 1060b can be included in one or more fields of a SDMA transmission 1005. In some implementations, a steered VHT-SIG 1050a, 1050b field can include a field for the number of 4-octets of a steered PSDU, a field for the number of symbols of the steered PSDU, or both. In some other implementations, a service field can include a field for the number of octets of a steered PSDU, a field for the number of 4-octets of the steered PSDU, a field for the number of symbols of the steered PSDU, or a combination thereof. An extended service field, in some other implementations, includes a field for the number of octets of a steered PSDU, a field for the number of 4-octets of the steered PSDU, a field for the number of symbols of the steered PSDU, or a combination thereof. The service field can include a checksum to protect against signal corruption and can include a full or partial destination address (e.g., AID, MAC address, or BSSID) for a receiving device to decide whether to process the remaining frame. In some implementations, length and duration information of steered data units can be included in a MAC frame element such as a MAC header, a delimiter, or a MPDU subframe.

Based on using a 4-octet unit for indicating a length of a steered PSDU, one or more PSDUs, in a MU frame, can be padded to a 4-octet boundary. The steered PSDU length indicates the PSDU 4-octet boundary. A receiver decodes until a PSDU's 4-octet boundary and stops receiving the MU frame. An A-MPDU format can be used, and the last A-MPDU subframe can be padded to a 4-octet boundary. Based on a PSDU with a Qword pad not exceeding the last symbol, the PSDU can be padded to a 4-octet boundary, which is indicated by the steered PSDU length field. Based on a PSDU with a Qword pad that exceeds the last symbol, the PSDU can be padded to the last octet; however, the steered PSDU length indicates the PSDU length plus the Qword pad. A recipient device can detect that a PSDU is padded to the last octet when finding that the steered PSDU length exceeds the last symbol boundary. In some implementations, a steered data unit length indicates a length of a PSDU plus Qword pad. In some implementations, a steered data unit length indicates a position of the last 4-octet boundary.

FIG. 11 shows another example of a spatial communication flow layout. A steered VHT-SIG field 1105 can indicate the end of useful data in a corresponding PSDU (e.g., end of useful data in an A-MPDU). After the end of useful data in a PSDU, there can be padding such as a MAC pad, PHY pad, or both. In some implementations, a steered VHT-SIG field 1105 includes the length (e.g., number of octets, or number of 4-octets) of useful data in a corresponding PSDU. In some implementations, a steered VHT-SIG field 1105 includes the duration (e.g. number of symbols) of useful data in a corresponding PSDU. As depicted by FIG. 11, a MAC pad, a PHY pad, and tail bits are appended to each A-MPDU. The L-SIG 1110 can include a length field, a rate field, or both to indicate the duration of a PPDU. In a MU frame 1100, multiple PPDUs have the same ending point, which is indicated by the L-SIG 1110.

A length field can be included in a steered VHT-SIG 1105 to indicate the number of octets or number of 4-octets of useful data included in a corresponding PSDU, exclusive of the padding and tail bits. Based on the length field, a receiving device can stop receiving at the end of the indicated useful data to save power and disregard the remaining data. In some implementations that are based on a length that represents the number of 4-octets, the length may indicate a 4-octet boundary which exceeds the last symbol boundary; in this case, a receiving device processes till the last byte of a PPDU and discards the remaining data such as a PHY pad and tail bits.

In some implementations, a duration field can be included in a steered VHT-SIG 1105 to indicate the number of symbols required to cover the useful data in a corresponding PSDU. Based on this duration field, the receiving PHY can stop receiving at the end of the indicated duration and discard the remaining data. The receiving MAC can determine the end of the useful data based on the last A-MPDU subframe passed from the receiving PHY. In some implementations, a receiving MAC can determine the end of the useful data based on a detected EOF padding delimiter.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand-alone program or as a module, component, subroutine, or other unit suitable for use a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   generating a physical layer frame, the physical layer frame comprising (i) spatially steered length fields and (ii) spatially steered frames that respectively include aggregated medium access control data units (A-MPDUs) that encapsulate data, wherein the steered length fields respectively indicate lengths of the A-MPDUs in number of four-octet units, wherein generating the physical layer frame comprises including after an A-MPDU of the A-MPDUs in a steered frame of the steered frames, (i) a medium access control layer pad and (ii) a physical layer pad, wherein a length of the medium access control layer pad and a length of the physical layer pad are based on the physical layer frame; and
   causing a transmission of the physical layer frame.

2. The method of claim 1, wherein the medium access control layer pad comprises one or more padding delimiters, and wherein generating the physical layer frame comprises including the one or more padding delimiters after a last non-zero-length A-MPDU subframe of the A-MPDU.

3. The method of claim 2, wherein each of the one or more padding delimiters is four octets in length, wherein generating the physical layer frame comprises including a medium access control pad after the one or more padding delimiters within the medium access control layer pad, and wherein the medium access control pad is an integer number of octets in length, which is less than four octets.

4. The method of claim 2, wherein the one or more padding delimiters indicate a medium access control protocol data unit length of zero.

5. The method of claim 1, wherein the medium access control layer pad comprises one or more padding delimiters, and wherein the one or more padding delimiters include an end-of-frame flag to inform a receiving wireless communication device to stop receiving a remaining portion of the physical layer frame.

6. The method of claim 1, comprising:
   causing the medium access control layer pad to reach to a last N-bit boundary of the physical layer frame, exclusive of physical tail bits in the physical layer frame, wherein N is either 8 or 32; and
   limiting the length of the physical layer pad to less than N bits.

7. The method of claim 1, comprising:
including, in the steered frame, tail bits after the physical layer pad.

8. The method of claim 1, wherein causing the transmission of the physical layer frame comprises causing transmissions of the steered frames that concurrently provide data to multiple wireless communication devices during the transmission of the physical layer frame, and wherein ends of the steered frames are aligned to have a same length.

9. An apparatus comprising:
processor electronics configured to generate a physical layer frame, the physical layer frame comprising (i) spatially steered length fields and (ii) spatially steered frames that respectively include aggregated medium access control data units (A-MPDUs) that encapsulate data, wherein the steered length fields respectively indicate lengths of the A-MPDUs in number of four-octet units, wherein the processor electronics are configured to include after an A-MPDU of the A-MPDUs in a steered frame of the steered frames, (i) a medium access control layer pad and (ii) a physical layer pad, wherein a length of the medium access control layer pad and a length of the physical layer pad are based on the physical layer frame; and
circuitry to transmit the physical layer frame.

10. The apparatus of claim 9, wherein the medium access control layer pad comprises one or more padding delimiters, and wherein the processor electronics are configured to include the one or more padding delimiters after a last non-zero-length A-MPDU subframe of the A-MPDU.

11. The apparatus of claim 10, wherein each of the one or more padding delimiters is four octets in length, wherein the processor electronics are configured to include a medium access control pad after the one or more padding delimiters within the medium access control layer pad, and wherein the medium access control pad is an integer number of octets in length, which is less than four octets.

12. The apparatus of claim 10, wherein the one or more padding delimiters indicate a medium access control protocol data unit length of zero.

13. The apparatus of claim 9, wherein the medium access control layer pad comprises one or more padding delimiters, and wherein the one or more padding delimiters include an end-of-frame flag to inform a receiving wireless communication device to stop receiving a remaining portion of the physical layer frame.

14. The apparatus of claim 9, wherein the processor electronics are configured to cause the medium access control layer pad to reach to a last N-bit boundary of the physical layer frame, exclusive of physical tail bits in the physical layer frame, wherein N is either 8 or 32, and wherein the processor electronics are configured to limit the length of the physical layer pad to less than N bits.

15. The apparatus of claim 9, wherein the processor electronics are configured to include, in the steered frame, tail bits after the physical layer pad.

16. The apparatus of claim 9, wherein the steered frames concurrently provide data to respective wireless communication devices during a transmission of the physical layer frame, and wherein ends of the steered frames are aligned to have a same length.

17. An apparatus comprising:
processor electronics configured to generate a physical layer frame, the physical layer frame comprising spatially steered frames that respectively include aggregated medium access control data units (A-MPDUs) that encapsulate data for transmission to respective wireless communication devices, wherein the processor electronics are configured to include after an A-MPDU of the A-MPDUs in a steered frame of the steered frames, (i) a medium access control layer pad having a length that is based on a number of symbols associated with the physical layer frame and (ii) a physical layer pad having a length that is based on a remainder of available bits in the steered frame, wherein ends of the steered frames are aligned to have a same length; and
circuitry to transmit the physical layer frame to the wireless communication devices.

18. The apparatus of claim 17, wherein the medium access control layer pad is based on a four-octet boundary, and wherein the medium access control layer pad comprises one or more padding delimiters.

19. The apparatus of claim 17, wherein the medium access control layer pad comprises one or more padding delimiters, and wherein the processor electronics are configured to include the one or more padding delimiters after a last non-zero-length A-MPDU subframe of the A-MPDU.

20. The apparatus of claim 17, wherein the medium access control layer pad comprises one or more padding delimiters, and wherein the one or more padding delimiters include an end-of-frame flag to inform a receiving wireless communication device to stop receiving a remaining portion of the physical layer frame.

21. The apparatus of claim 17, wherein the processor electronics are configured to cause the medium access control layer pad to reach to a last N-bit boundary of the physical layer frame, exclusive of physical tail bits in the physical layer frame, wherein N is either 8 or 32, and wherein the processor electronics are configured to limit the length of the physical layer pad to less than N bits.

* * * * *